United States Patent [19]

Okamoto et al.

[11] Patent Number: 4,761,468

[45] Date of Patent: Aug. 2, 1988

[54] PROCESS FOR PREPARING POLYARYLENE THIOETHER HAVING THIOL/THIOLATE END GROUP CONCENTRATION OF 10 MICRO MOLE/G OR LESS

[75] Inventors: Tsuneo Okamoto; Takao Iwasaki; Yo Iizuka; Zenya Shiiki, all of Fukushima, Japan

[73] Assignee: Kureha Kagaku Kogyo Kabushiki Kaisha, Tokyo, Japan

[21] Appl. No.: 15,346

[22] Filed: Feb. 17, 1987

[30] Foreign Application Priority Data

Feb. 14, 1986 [JP] Japan .................................. 61-30457

[51] Int. Cl.[4] .............................................. C08G 75/14
[52] U.S. Cl. ...................................... 528/388; 526/59; 526/60
[58] Field of Search ...................... 528/388; 526/59, 60

[56] References Cited

U.S. PATENT DOCUMENTS

| | | | |
|---|---|---|---|
| 3,408,342 | 10/1968 | Horvath et al. | 528/388 |
| 4,238,585 | 12/1980 | Bertozzi | 528/388 |
| 4,282,347 | 8/1981 | Tieszen et al. | 528/388 |
| 4,324,886 | 4/1982 | Edmonds et al. | 528/388 |
| 4,362,864 | 12/1982 | Idel et al. | 528/388 |
| 4,605,732 | 8/1986 | Heitz et al. | 528/388 |
| 4,608,433 | 8/1986 | Meyer et al. | 528/388 |

FOREIGN PATENT DOCUMENTS

| | | |
|---|---|---|
| 0053344 | 9/1982 | European Pat. Off. . |
| 0166368 | 2/1986 | European Pat. Off. . |
| 0614428 | 1/1986 | Japan . |

*Primary Examiner*—Harold D. Anderson
*Attorney, Agent, or Firm*—Wenderoth, Lind & Ponack

[57] ABSTRACT

In a process for producing a polyarylene thioether having high stability by dehalogenation/sulfurization reaction of an alkali metal (M) sulfide such as sodium sulfide and a dihaloaromatic compound such as paradichlorobenzene in a polar organic solvent, the haloaromatic compound is used excessively in an appropriate range rather than the alkali metal sulfide and the latter stage of the reaction or all period of the reaction is conducted under a powerful stirring condition to a certain degree to obtain the polyarylene thioether wherein the concentration of —SM or —SH groups of the polymer terminal is lowered. The polyarylene thioether thus obtained suppresses the coloration in the processing with an apparatus made of ferrous material such as extruder.

9 Claims, 1 Drawing Sheet

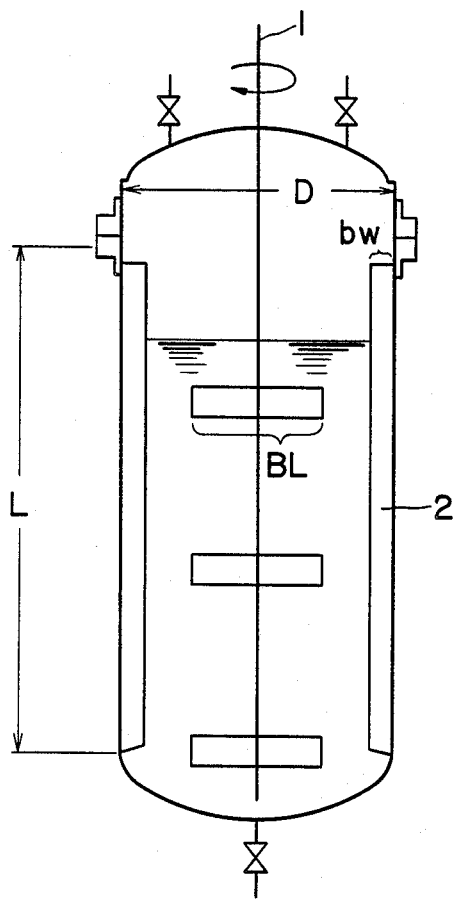

PROCESS FOR PREPARING POLYARYLENE THIOETHER HAVING THIOL/THIOLATE END GROUP CONCENTRATION OF 10 MICRO MOLE/G OR LESS

BACKGROUND OF THE INVENTION

1. Field of the Art

This invention relates to a process for producing polyarylene thioethers having high stability. More particularly, this invention relates to a process for producing stable polyarylene thioethers by the reaction of an alkali metal sulfide and a dihaloaromatic compound in a polar organic solvent, characterized in that total charge of the haloaromatic compound (dihaloaromatic comound alone or mixture) is used in an appropriately excessive amount to the effective charge of the alkali metal sulfide and the reaction is continued until the concentration of a thiolate group or a thiol group at the resulting polyarylene thioether terminal reaches 10 $\mu$mole/g or less by intense stirring for substantial mixing at least on the latter step of the reaction.

2. Prior Art

Polyarylene thioethers are thermoplastic resins having high crystallizability and can be processed into not only molded articles by injection molding or the like but also film, sheet, plate, fiber or other formed articles by extrusion molding, compression molding, inflation, melt spinning, stretching or the like. Therefore, it has been expected that formed articles by melt process having excellent properties might be obtained.

However, conventional commercially available polyarylene thioethers are mostly the resins wherein relatively low melt viscosity materials (i.e. materials of low molecular weight) is "cured" or treated at an elevated temperature in the presence of oxygen or the like to cause crosslinking, branching or the like so that the apparent melt viscosity is increased. Such resins of which melt viscosity is increased by "curing" have many problems such as strong coloration (in this invention, "coloration" means spontaneous coloration or discoloration and does not mean intentional coloration by addition of colorants), an insufficient mechanical strength due to the structure of a lot of crosslinking and branching and particularly thermal instability which tends to cause stronger coloration and gelation thus increasing viscosity upon melt processing.

There have been also developed processes for preparing high molecular weight linear polyarylene thioethers by a process of polymerization wherein a large amount of an organic carboxylate such as lithium acetate (Specification of U.S. Pat. No. 4,038,259) is added or a process of polymerization wherein a large amount of water is added and a simultaneously polymerization temperature is increased during polymerization (the two-step polymerization with supplementation of water, Japanese Patent Laid-Open Publication No. 14228/86). The polyarylene thioethers obtained by these processes generally have sufficiently high melt viscosity and can be subjected to melt processings such as extrusion without curing, compression molding, stretching, heat setting and the like, so that it has been expected to obtain formed products which have excellent mechanical properties and low coloration.

However, the former process has a problem that cost for production is high, and the latter process, which is excellent in economy, has also a problem that coloration tends to occur like in the case of the former process in the conventional melt processing wherein polymer powder is subjected to melting in a cylinder of an extruder, particularly a ferrous extruder.

DESCRIPTION OF THE INVENTION

The present inventors have suspected that the main factor of coloration in polyarylene thioethers, even if they are not "cured", in melt processing by the use of a melt extruder which is constructed with ferrous materials is the reaction of the thiolate structure $-(SM)$ (M: alkali metal), the thiol structure $-(SH)$ or the other chemical structures derived from these structures (for example $-(S-S)-$ and the like) at the terminal of a polymer with the metal surface (particularly the iron surface) of the processing machine during melting.

Thus, the present inventors have conducted researches in detail for the terminal structure of the polyarylene thioether after completion of polymerization. As the result, they have found that when polymerization was conducted in the conventional method, that is, the polymerization method wherein an alkali metal sulfide and a dihaloaromatic compound are reacted in a polar organic solvent under the conventional reaction condition, for example when a para-isomer is used as the dihaloaromatic compound, most of both terminals of the polymer chain are present in the form of thiolate or thiol structures in the polymerization system in the initial period of the polymerization, but most of the polymer chains are present in the polymerization system in the form wherein one of the terminal of the polymer chain has in average a thiolate or thiol structure and the other terminal has a structure $-(S-ArX)$ (Ar: arylene group, X: halogen) in final period of the polymerization.

Thus, the present inventors have finally found that under the conventional polymerization condition a polymer having in average a thiolate or thiol structure in one terminal is obtained upon the completion of polymerization and the thermal structure or the chemical structures derived therefrom ($-SS-$ or the like) will lower the stability of the polymer.

SUMMARY OF THE INVENTION

The present inventors have conducted researches on whether a polymer having the least quantity of thiolate or thiol structure at the terminal of the polymer chain can be produced or not. As the result, they have finally obtained a polymer which has an extremely low content of the thiolate group or the thiol group by polymerization reaction wherein an appropriately excessive amount of the total charge of the dihaloaromatic compound to the effective charge of the alkali metal sulfide is used and stirring with intense mixing is used.

This invention has been accomplished based on these findings.

Therefore, the process for producing a polyarylene thioether having high stability according to this invention is a process for producing a polyarylene thioether by dehalogenation/sulfidization reaction of an alkali metal sulfide with a dihaloaromatic compound in a polar organic solvent, characterized in that the reaction is continued until the concentration of a thiolate group or a thiol group at the resulting polyarylene thioether terminal reaches 10 $\mu$mole/g or less by at least adopting the following conditions (a) and (b):

(a) the dihaloaromatic compound is used as the major component of a haloaromatic compound so that the ratio of an equivalent weight of the total charge (B) of the haloaromatic compound to an equivalent weight of the effective charge (A) of the alkali metal sulfide, (B)/(A), is in the range of 1.002–1.25, and (b) at least in the latter period of the reaction, an apparatus which maintains stirring power member of at least 1.2 at a Reynolds number of at least $5 \times 10^4$ is used and the reaction is carried out under such a stirring condition that stirring power is at least 1.0 (kw/m$^3$).

According to this invention, the object of stabilization can be achieved by a simple method that the dihaloaromatic compound having been charged in an appropriately excessive amount is reacted with the terminal group of a polyarylene thioether produced, and no complicated procedure such as the post-addition of the dihaloaromatic compound during polymeriztion is required.

The polyarylene thioether obtained by the process according to this invention contains only very low amount of a thiolate group or a thiol group at the terminal group and has very high thermal and chemical stabilities, so that gelation or coloration will not occur during extrusion with an extruder constructed with a ferrous material. Therefore, it is possible to obtain substantially colorless and transparent melt processed articles such as film, sheet, fiber, etc. Additionally, when a pigmented or dyed product is desired, it is also possible to obtain a melt processed article having a high chroma.

DETAILED DESCRIPTION OF THE INVENTION

_Preparation of Polymers

Main materials

The basic structure of the polyarylene thioether is formed based on the dehalogenation/sulfidization reaction of the alkali metal sulfide with the dihaloaromatic compound in a polar organic solvent. Thus, the primary materials used for the preparation of the polyarylene thioether of this invention are an alkali metal sulfide and a dihaloaromatic compound.

(a) Alkali metal sulfide

Alakli metal sulfides used in this invention including sulfides formed in situ include lithium sulfide, sodium sulfide, potassium sulfide, rubidium sulfide, cesium sulfide and mixtures thereof. These alkali metal sulfides can be used as hydrates or aqueous mixtures or as the anhydrides, and those formed in situ can also be used.

Among these alkali metal sulfides, sodium sulfide is most inexpensive and therefore preferred.

It is probable that alkali metal polysulfides or alkali metal thiosulfates are contained in trace amounts in the alkali metal sulfides. It is thus permissible to use in combination with the sulfides a small amount of an alkali metal hydroxide for removing or transforming these impurities into the corresponding sulfides.

From the aspect of low impurities, the crystal of sodium sulfide.pentahydrate is most preferred among the commercially available alkali metal sulfides.

(b) Haloaromatic compound

The term "haloarmoatic compound" in this invention means haloaromatic compound which has as its major component a dihaloaromatic compound which is essential for the formation of the polyarylene thioether structure. The term "major component" means that the dihaloaromatic compound is present at least in an equimolar amount to the effective charge of the alkali metal sulfide.

As the dihaloaromatic compound used in this invention, those disclosed in the specification of Japanese Patent Laid-Open Publication No. 22926/84 may be used. Specifically, preferably used are dihaloaryls such as p-dichlorobenzene, m-dichlorobenzene, o-dichlorobenzene, 2,5-dichlorotoluene, p-dibromobenzene, p,p'-dichlorodiphenyl, 1,4-dichloronaphthalene and the like; dihaloaryl ethers such as p,p'-dichlorodiphenyl ether and the like; dihaloaryl thioethers such as p,p'-dichlorodiphenyl thioether and the like; dihaloaryl ketones such as p,p'-dichlorodiphenyl ketone and the like; and dihaloarylsulfones such as p,p'-dichlorophenylsulfone and the like.

These dihaloaromatic compounds preferably have the group

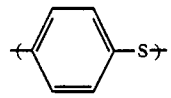

as much as possible for the purpose of obtaining a polyarylene thioether having high heat resistance, and thus p-dichlorobenzene is preferably used. From the aspect of ready melt processing, the copolymer of

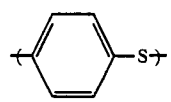

is preferred rather than the homopolymer thereof and the aforementioned dihalo compounds are used in combination with p-dichlorobenzene depending on uses. Particularly, from the standpoints of heat resistance, processability and mechanical properties, m-dichlorobenzene and/or o-dichlorobenzene are preferably used as the comonomer. The amount used is preferably 5 to 40 mole %, particularly 10 to 25 mole %, of the total mixture. When the amount is 5 mole % or more, the improved effect of processability appears. When it is 40 mole % or less, heat resistance and mechanical properties are not excessively decreased. Furthermore, in the case of copolymerization, compounds having a strong polar group such as p,p'-dichlorodiphenylsulfone or the like give chemically inferior structures, and it is thus desirably present in a small amount.

As mentioned above, the dihaloaromatic compound is preferably present in an amount at least equimolar to the effective charge of the alkali metal sulfide. The portion over the equimolar amount, that is the excessive portion can partly or totally be a monohaloaromatic compound. THe monohaloaromatic compound includes monohaloaryls such as 1-chloronaphthalene, m-chlorotoluene, bromobenzene and the like; monohaloaryl ethers such as p-chloroanisole, m-chloroanisole and the like; monohaloaryl thioethers such as p-chlorodiphenyl thioether and the like; etc.

Additionally, it is also possible to use a polyhalosubstituted aromatic compounds having 3 or more halo substituents provided that the physical and processing properties of the polyarylenethioethers produced are not substantially degraded.

Polymerization solvent

Polymerization solvents are not main materials, but improtant for obtaining a high molecular weight polyarylene thioether.

As the organic solvent to be used in the polymerization reaction of this invention, mention is made of N-methylpyrrolidone (NMP), N-ethylpyrrolidone, N,N-dimethylformamide, N,N-dimethylacetamide, N-methylcaprolactam, tetramethylurea, hexamethylphosphoric triamide, 1,3-dimethyl-2-imidazolinone, mixture thereof, etc. Among them, N-methylpyrrolidone is particularly preferred. The organic solvent as a polymerization solvent is preferably an aprotic compound.

The amount of the organic solvent is preferably used in a proportion of 0.2 to 5 kg per mole of the effective charge of the alkali metal sulfide used.

Polymerization method

The basic structure of the polyarylene thioether is formed based on the dehalogenation/sulfidization reaction of the dihaloaromatic compound with the alkali metal sulfide in a polar organic solvent. Particularly, when a substantially linear high molecular weight polyarylene thioether is required, the afore-mentioned method of "two-step polymerization with supplementation of water" is preferred. When the thioether is intended to use for sealed articles or the like, the conventional preparation method of polyarylene thioether can be resorted to.

In the case of copolymers, block copolymers are often more preferable than random copolymers, and for the preparation of the block copolymer comprising the block of

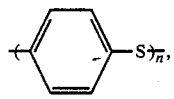

there may be used, for example, a method disclosed in the specification of Japanese patent Laid-Open Publication No. 14228/86. In order to give melt formed articles having high thermal stability and excellent color tone, it is preferred to use a reaction apparatus of which the part contacting with the reaction solution is constructed with a titanium material rather than the conventional reactor made of a ferrous material.

This invention is characterized in that such usual polymerization methods are conducted under vigorous stirring condition.

As mentioned above, in the conventional polymerization method a polyarylene thioether which contains a terminal thiolate or thiol group and a terminal halogen group at a substantially equal level of concentration as the terminal structure is produced upon the completion of polymerization. Therefore, in order to eliminate or reduce the terminal thiolate or thiol groups, a specific method is required. That is to say, the process of this invention is characterized by the fact that the polymerization is carried out with satisfying at least the following two conditions: (i) controlling the total charge of the haloaromatic compound to the effective charge of the alkali metal sulfide, which effective charge means such an effective residual amount that the loss by dehydration operation before initiation of polymerization has been subtracted from the initial charge, in an appropriately excessive level and (ii) conducting the reaction with intense stirring which is sufficiently effective for mixing at least at the latter stage of the polymerization reaction, so that the excessive amount of the haloaromatic compound is compulsively and effectively reacted with the thiolate or thiol groups at the polymer terminals until the concentration of the thiolate or thiol group reaches 10 μmole/g or less.

(1) Charge/quantity

As regards the total charge (B) of the haloaromatic compound of this invention, the ratio thereof to the average charge (A) of the alkali metal sulfide, (B)/(A), is preferably in the range of 1.002–1.25 (equivalent weight/equivalent weight), particularly 1.005–1.2 (equivalent weight/equivalent weight). If the ratio is less than 1.002, the excessive amount remains in low level and therefore tends to be insufficient for transforming the thiolate or thiol groups. On the other hand, if the ratio exceeds 1.25, a polymer having the desired molecular weight may hardly be produced.

Among the charge of the haloaromatic compound, at least the equimolar amount to the effective charge of the alkali metal sulfide is preferably charged as the dihaloaromatic compound for obtaining the high molecular weight polyarylene thioether. As already described above, a part or all of the portion over the equimolar amount, that is the excessive portion, can be a monohalo-substituted aromatic compound.

With respect to the timing of charging the haloaromatic compound, it is most advantageous to charge the total amount at the initiation of polymerization. However, the excessive portion, particularly other than the dihaloaromatic compound can also be charged during polymerization.

(2) Stirring condition

Stirring during the polymerization reaction according to this invention is carried out from the aspect of intense stirring for effective mixing and effective increase of probability of collision of the thiolate or thiol groups of at the terminal of the resulting polymer to the residual haloaromatic compound so that the once-formed terminal of the polymer chain is modified.

Thus, first of all, the stirring condition is required to ensure that the reaction by the aforementioned collision will sufficiently be caused. Even if the stirring rate is high, it will be difficult to provide the reaction mixture with sufficient agitation if the reaction mixture undergoes a laminar flow, particularly when a reactor having a large volume of 1 m³ or more is used for the reaction. It is necessary for stirring having a mixing effect which can conduct satisfactory reaction to use an apparatus wherein the stirring power number $N_p$ represented by the following formula is 1.2 or more, more preferably 1.4 or more:

$$P = N_p \frac{n^3 d^5 \rho}{g_c}$$

P: stirring power (kw/m³),
$N_p$: stirring power number,
$\rho$: density of the reaction mixture (kg/m³),
n: stirring rate (rps, rotation per second),
d: length of stirring blade (M),
$g_c$: gravity conversion factor (=9.81 kg·m/kg·sec²).
  Even if such a reactor is employed, the reaction at the terminal group cannot be satisfactorily caused with an excessively low stirring rate or the like. Thus, it is necessary to apply the stirring power P of 1.0 kw/m³ or more, preferably 1.1 kw/m³ or more.

It is believed that in the case of conventional production of a polyarylene thioether, through polymerization, particularly when an apparatus having a large volume of 1 m³ or more was employed, stirring was generally carried out under the conditions that stirring power number was less than 1.2 or stirring power was less than 1.0 kw/m³. Thus, it is presumed that the agitation of the reaction mixture was not sufficient and the reaction of the terminal thiolate or thiol group with the residual haloaromatic compound to a satisfactory extent was hard.

Stirring power number $N_p$ is a constant of a reactor which varies depending on Reynolds number, but the term "stirring power number" in this invention indicates the stirring power number in the range of relatively constant value with Reynolds number of $5 \times 10^4$ or more. According to the experiences of the present inventors, if the stirring power number is small, it is difficult from the standpoint of apparatus design to obtain a large stirring power of $P > 1.0$ kw/m³ because the unacceptable increase of stirring rate or stirring blade length is required, and, furthermore, even if the stirring power of $P > 1.0$ kw/m³ is obtained, it is not possible to cause the desired reaction. As the reactor wherein the stirring power number is 1.2 or more with Reynolds number of $5 \times 10^4$ or more, preferably used, for example, is an apparatus equipped with effective number of baffles.

The period and time for stirring under the stirring condition of this invention can be any period and time during which the concentration of the terminal thiolate or thiol groups reaches 10 $\mu$mole/g. Stirring of this type can be carried out over all reaction period from the initiation of the reaction. Alternatively, stirring can also be carried out so that the stirring of this type is carried out only for the final stage of the reaction, the stirring for the initial stage being of a conventional type. When stirring is carried out under this particular stirring condition of this invention, for the initial stage of the reaction, the molecular weight of the resulting polyarylene thioether tends to be lowered. Thus, when a high molecular weight polymer is required, it is preferred that stirring under this condition be conducted only for the final stage of the reaction. The term "final stage" indicates the period near the completion time of reaction. When stirring is conducted under this stirring condition only for the final stage of reaction, it is preferably conducted at least for 1 hour or more, particularly for 2 hours or more before completion of reaction. If stirring continues for less than 1 hour, the reaction of the terminal thiolate or thiol groups with the remaining halo-substituted aromatic compound tends to be insufficient.

The aforementioned polymerization process of this invention can be applied to all of the polymerization processes for producing the homopolymer, copolymer, and block polymers of the polyarylene thioether. Particularly, the aforementioned method fo the two-step polymerization with addition of water is one of the methods whereto the polymerization process according to this invention is applied. In other words, it is desirable to carry out the reaction for producing a polyarylene thioether by conducting the polymerization in the former stage with a water content of 2.4 moles or less per mole of the effective charge (A) of the alkali metal sulfide at a temperature of 230° C. or less and conducting the polymerization in the latter stage with a water content of 2.5–10 moles per mole of the effective charge of the alkali metal sulfide in the reaction system at a temperature of 240°–280° C. during the period wherein the conversion of the dihalo-substituted aromatic compound is 90 mole % or more and the melt viscosity of the polymer produced is 300 poise, determined at a temperature of 310° C. and a shear rate of 200 sec$^{-1}$ or less, wherein, in order to obtain the high molecular weight polymer having a melt viscosity of 1,000 poise or more and high stability, both the raw materials are charged in the range of the ratio (B)/(A) of 1.0025–1.09 (mole/mole), at least the former stage of the polymerization, during which no water has not been supplemented, is conducted with the stirring which will satisfy either one of the stirring conditions (a) that a reactor having a stirring power number of less than 1.2 is used or (b) that the stirring power applied is less than 1.0 (kw/m³), and the latter stage of the polymerization, during which water has been supplemented, is conducted with stirring which will satisfy the stirring conditions that a reactor having stirring power number of 1.2 or more is used and intense stirring with a stirring power of 1.0 kw/m³ or more is conducted. By this method, a substantially linear and high molecular weight polyarylene thioether having high stability can readily be obtained. In passing, the size of polymerization vessels for production of polyarylene thioethers is necessarily restricted to a certain level due to restriction in effective removal of heat of polymerization and is usually several ten cubic meters at the highest.

Detection of terminal structure

The polyarylene thioether obtained according to this invention has an extremely decreased concentration of the terminal thiolate or thiol groups. The terminal thiolate or thiol groups can be quantitatively determined by the mercapto group determination method used iodoacetamide.

The terminal thiolate or thiol groups of the polyarylene thioether obtained in this invention have a concentration of 10 $\mu$mole/g.

Polymer of the Invention

The polyarylene thioether of this invention has an extremely high stability compared with that of conventional polyarylene thioethers. Thus, even when it is melt extruded with a melt processing apparatus which is constructed with iron materials, decomposition reaction occurs only rarely. Thus, clear melt molded articles wherein coloration or denaturation occurs only rarely are obtained.

Particularly, there can be industrially produced clear film, sheet, yarn, bottles, and molded articles which are extremely low in coloration. Additionally, injection molded articles or extrusion articles having excellent color hue with or without addition of pigments or dyes can be produced.

The polyarylene thioether polymer of this invention belongs to the category of thermoplastic polymers, and thus it is possible to conduct a variety of processing or modification which is applicable to thermoplastic polymers. Thus, the polymer can also be used with being filled with powdery fillers such as carbon black, calcium carbonate powder, silica powder, titanium oxide powder or the like or fibrous fillers such as carbon fiber, glass fiber, asbestos, polyaramide fiber or the like. The polymer can also be used with being incorporated with one or more of synthetic resins such as polycarbonate, polyphenylene oxide, polysulfone, polyarylene, polyacetal, polyimide, polyamide, polyester, polystyrene, ABS or the like.

EXPERIMENTAL EXAMPLES

Examples P1–P6, Comparative Examples PP1–PP2

(1) Preparation of polymer

Two types of reaction vessels X and Y having different stirring power numbers at Reynolds number of $5 \times 10^4$ were used. The structures of X and Y are illustrated in the drawings. In the drawings, D: vessel diameter, L: length of vessel, BL: blade length, bw: baffle width. In the vessel X, D=1100 mm, L=2300 mm, BL=725 mm (inclination, 45°), no baffles; and in the vessel Y, D=1100 mm, L=2300 mm, BL=600 mm (inclination, 45°), bw=110 mm, 4 baffles.

In one of the reaction vessels a commercial hydrated sodium sulfide was charged together with N-methylpyrrolidone. Temperature was raised up to ca. 200° C. before initiation of polymerization and an appropriate amount of water was removed by evaporation to control the water content in the reaction mixture. All of $H_2S$ removed by evaporation during the operation was collected and determined, so that the effective charge of $Na_2S$ was calculated and the corresponding amount of the haloaromatic compound was charged to react at a certain temperature for a certain period (polymerization in the former stage).

Then, polymerization in the latter stage was subsequently conducted for a certain period with the use of the same vessel or another vessel with or without changing the water content and temperature. The reaction conditions such as the amount and ratio of respective raw materials, the types of reaction vessels, stirring power, power number, reaction temperature, time and the like are listed collectively in Table 1.

After reaction, part of the reaction mixture (slurry) was taken and immediately subjected to the quantitative determination of the terminal thiolate or thiol groups. The remaining slurry was filtered, purified by washing with acetone and water and dried to obtain a powdered polymer.

In Table 1, the water content (mole/mole) in the reaction mixture represents the molar ratio of the water content and the effective charge of sodium sulfide. p-DCB represents paradichlorobenzene, m-DCB metadichlorobenzene, and NMP N-methylpyrrolidone.

(2) Analysis of terminal thiolate or thiol groups
  (a) Principle
    (i) Acidification

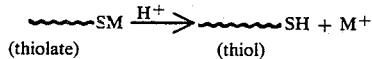

(ii) Iodo-acetamide method

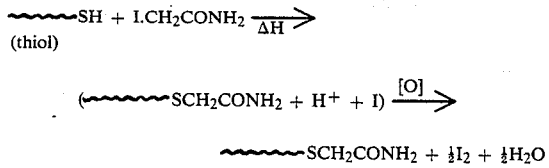

(b) Operation

After completion of polymerization reaction, part of the reaction mixture was taken out, poured into water to cool the slurry. The polymer was filtered, washed with pure water, then treated with dil. aqueous hydrogen chloride to convert the terminal thiolate group into the thiol group. It was washed with pure water for 30 minutes, washed further with acetone for 30 minutes, dried under reduced pressure in a vacuum dryer at room temperature to obtain a polymer sample. Then, the polymer sample in an amount of ca. 10 mg to 1 g was immediately weighted precisely and placed in a stoppered test tube. 2.5 ml of an acetone solution consisting of 2.5 ml of acetone and 50 mmole of iodo-acetamide was added to the test tube. It was stoppered tightly, heated at 100° C. for 60 minutes and cooled with water. The stopper was removed and the liquid phase was separated and measured its absorbance at 460 nm which corresponds to the absorbance of $I_2$ with a UV-spectrometer. In the light of the calibration curve which had preliminarily been made on the model thiol compound

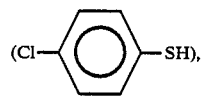

the concentration of the terminal thiol group was calculated from the absorbance. (The amount of the sample is preferably selected to ensure that the concentration of the thiol group in the acetone slurry is in the range of 0.1–0.3 mmole). 3 runs of measurement were conducted for the same dried sample and the average concentration of the terminal thiol group was calculated. The results are collectively shown in Table 2.

(3) Measurement of melt viscosity

Using a Koka flow tester, the melt viscosity at 310° C. was measured for the polymer powder (shear rate=200 $sec^{-1}$).

Melt viscosities of respective polymers are shown in Table 1.

Stirring powder (P):

Value determined by measuring the consumed electric power of stirring motor.

Stirring power number ($N_p$):

Obtained from the experimental data in Examples in accordance with the following equation:

$$N_p = Pg_c/n^3 d^5 \rho$$

wherein P: stirring power, $g_c$: gravity conversion factor=9.81 kg·m/kg·sec², $\rho$: density, n: rotation speed (rps), d: length of stirring blade.

(4) Evaluation of stability

In order to evaluate the stability of the polyarylene thioether obtained, each of polymers was heated to 320° C. to melt it and processed by extrusion into pellets. The degree of coloration by heating in the melt processing was used as a measure of stability. That is, the polymer powders P1–P6, PP1–PP4 illustrated in Table 1 were subjected to melt processing with the use of a uniaxial kneading-extruder (cylinder: nitriding steel, screw barrel: nitriding steel) to form pellets. The pellets were pressed under the condition of pre-heating for 320° C./2 min. and compressing for 320° C./1 min., then water-cooled immediately to prepare a sheet having a thickness of 0.3 mm. HUNTER whiteness of the sheet was measured with a color difference meter (Tokyo Denshoku Kogyo K.K., Color Ace) to compare the degree of coloration. The results are collectively listed in Table 2.

TABLE 1(a)

| | | Example No. | | | | | | |
|---|---|---|---|---|---|---|---|---|
| | | P-1 | PP-1 | P-2 | | PP-2 | | P-3 | PP-3 |
| $Na_2S \cdot nH_2O$ | Purity (%) | 45.85 | 45.85 | 45.56 | | 45.56 | | 45.56 | 45.56 |
| | Charge (kg equivalent) | 4.40 | 4.40 | 4.40 | | 4.40 | | 4.40 | 4.40 |
| | (A) Effective charge (kg equivalent) | 4.25 | 4.23 | 4.22 | | 4.24 | | 4.25 | 4.22 |
| Haloaromatic compound | Kind | p-DCB | p-DCB | p-DCB | m-DCB | p-DCB | m-DCB | p-DCB | p-DCB |
| | Charge (kg equivalent) | 4.33 | 4.31 | 4.20 | 0.15 | 4.22 | 0.15 | 4.68 | 4.64 |
| | (B) Total charge (kg equivalent) | 4.33 | 4.31 | 4.35 | | 4.37 | | 4.68 | 4.64 |
| Charge ratio | (B)/(A) (equivalent weight/equivalent weight) | 1.02 | 1.02 | 1.03 | | 1.03 | | 1.10 | 1.10 |
| Solvent | Kind | NMP | NMP | NMP | | NMP | | NMP | NMP |
| | Charge (kg) | 1100 | 1100 | 1100 | | 1100 | | 1100 | 1100 |
| Polymerization at the former stage | Coexisting water content (mole/mole) | 1.48 | 1.50 | 1.50 | | 1.48 | | 4.0 | 4.0 |
| | Temp. (°C.)/Time (hrs) | 220/5 | 220/5 | 220/5 | | 220/5 | | 220/5 | 220/5 |
| | Reaction vessel | Y | Y | Y | | X | | Y | Y |
| | Stirring { stirring power number | 1.7 | 1.7 | 1.7 | | 1.0 | | 1.6 | 1.7 |
| | stirring power (kw/m³) | 0.7 | 0.7 | 0.7 | | 0.7 | | 1.4 | 1.4 |
| | Conversion (mole %) | 94 | 95 | 92 | | 91 | | 85 | 86 |
| | Viscosity of resulting polymer (poise) | 20 | 20 | 10 | | 10 | | <2 | <2 |
| Water added | (kg mole) | 4.30 | 4.23 | 4.22 | | 4.28 | | 0 | 0 |
| Polymerization at the latter stage | Coexisting water content (mole/mole) | 3.50 | 3.50 | 3.50 | | 3.50 | | 4.0 | 4.0 |
| | Temp. (°C.)/Time (hrs) | 255/5 | 225/5 | 255/6 | | 255/6 | | 260/5 | 260/5 |
| | Reaction vessel | Y | X | Y | | Y | | Y | X |
| | Stirring { stirring power number | 1.6 | 1.0 | 1.7 | | 1.7 | | 1.6 | 0.9 |
| | stirring power (kw/m³) | 1.4 | 1.4 | 1.4 | | 0.7 | | 1.2 | 1.2 |
| | Resulting polymer { viscosity (poise) | 2200 | 2400 | 2000 | | 2100 | | 90 | 100 |
| | polymer code | P-1 | PP-1 | P-2 | | PP-2 | | P-3 | PP-3 |
| Remarks | | | | | | | | low viscosity product | low viscosity product |

TABLE 1(b)

| | | Example No. | | | | | |
|---|---|---|---|---|---|---|---|
| | | P-4 | | PP-4 | | P-5 | P-6 |
| $Na_2S \cdot nH_2O$ | Purity (%) | 46.11 | | 46.11 | | 45.85 | 45.85 |
| | Charge (kg equivalent) | 4.40 | | 4.40 | | 4.40 | 4.40 |
| | (A) Effective charge (kg equivalent) | 4.25 | | 4.25 | | 4.25 | 4.22 |
| Haloaromatic compound | Kind | p-DCB | 1-chloro-naphthalene (*1) | p-DCB | 1-chloro-naphthalene (*1) | p-DCB | p-DCB |
| | Charge (kg equivalent) | 4.28 | 0.25 | 4.28 | 0.25 | 4.36 | 4.30 |
| | (B) Total charge (kg equivalent) | 4.53 | | 4.53 | | 4.36 | 4.30 |
| Charge ratio | (B)/(A) (equivalent weight/equivalent weight) | 1.07 | | 1.07 | | 1.025 | 1.02 |
| Solvent | Kind | NMP | | NMP | | NMP | NMP |
| | Charge (kg) | 1100 | | 1100 | | 1100 | 1100 |
| Polymerization at the former stage | Coexisting water content (mole/mole) | 1.48 | | 1.50 | | 1.47 | 1.49 |
| | Temp. (°C.)/Time (hrs) | 215/6 | | 215/6 | | 215/6 | 220/5 |
| | Reaction vessel | Y | | Y | | X | Y |
| | Stirring { stirring power number | 1.7 | | 1.7 | | 1.0 | 1.7 |
| | stirring power (kw/m³) | 0.7 | | 0.7 | | 0.7 | 1.4 |
| | Conversion (mole %) | 90 | | 91 | | 92 | 96 |
| | Viscosity of resulting polymer (poise) | 10 | | 10 | | 10 | 20 |
| Water added | (kg mole) | 4.30 | | 4.25 | | 4.32 | 4.24 |
| Polymerization at the latter stage | Coexisting water content (mole/mole) | 3.50 | | 3.50 | | 3.50 | 3.50 |
| | Temp. (°C.)/Time (hrs) | 255/6 | | 255/6 | | 255/3 260/2 | 255/5 |
| | Reaction vessel | Y | | X | | Y | Y |
| | Stirring { stirring power number | 1.6 | | 0.9 | | 1.7 | 1.7 |
| | stirring power (kw/m³) | 1.4 | | 1.4 | | 1.4 | 1.4 |
| | Resulting polymer { viscosity (poise) | 1800 | | 2100 | | 2300 | 850 |
| | polymer code | P-4 | | PP-4 | | P-5 | P-6 |
| Remarks | | (*1) added after 3 hours from initiation of polymerization at the latter stage | | (*1) same as left | | | low viscosity product |

TABLE 2

| Polymer code | Terminal thiolate or thiol concentration (μ mole/g) | HUNTER whiteness (%) |
|---|---|---|
| P-1 | 4 | 39 |
| P-2 | 7 | 37 |
| P-3 | <1 | 45 |
| P-4 | 5 | 39 |

TABLE 2-continued

| Polymer code | Terminal thiolate or thiol concentration (μ mole/g) | HUNTER whiteness (%) |
|---|---|---|
| P-5 | 2 | 41 |
| P-6 | 6 | 37 |
| PP-1 | 21 | 5 |
| PP-2 | 20 | 4 |
| PP-3 | 23 | 7 |
| PP-4 | 22 | 7 |

In Examples P1–P6 of this invention, the terminal thiolate or thiol group concentration was 10 μmole/g polymer and the HUNTER whiteness was 30% or more which showed low coloration. By contrast, in Comparative Examples PP-1, PP-3 and PP-4 wherein the vessel X having a small stirring power number was used on polymerization at the latter stage and in Comparative Example PP-2 wherein the vessel Y having a large stirring power number and a low stirring power was used at the latter stage, stirring effect was poor and the reaction was insufficient. The terminal thiolate or thiol group concentration was over 10 μmole/g polymer and HUNTER whiteness was small and thus coloration was severe.

What is claimed is:

1. In a process for producing a polyarylene thioether by the dehalogenation/sulfidization reaction of an alkali metal sulfide with a dihaloaromatic compound in a polar organic solvent, the improvement which comprises continuing the reaction until the concentration of a thiolate group or a thiol group at the resulting polyarylene thioether terminal reaches 10 micro mole/g or less by adopting at least the following conditions:

(a) the dihaloaromatic compound is the major component of a haloaromatic compound and the ratio of an equivalent weight of total charge (B) of the haloaromatic compound to an equivalent weight of effective charge (A) of the alkali metal sulfide, (B)/(A), is in the range of 1.002 to 1.25, and
   (b) at least the latter period of the reaction is conducted in an apparatus which has stirring power number of 1.2 or more at a Reynolds number of $5 \times 10^4$ or more under the stirring condition such that stirring power is 1.0 kw/m$^3$ or more.

2. The process for producing a polyarylene thioether according to claim 1, wherein a former stage of polymerization is carried out at a temperature of 230° C. or lower with water content of 2.4 mole or less per mole of (A) in the reaction mixture of a polar organic solvent, an alkali metal sulfide, a haloaromatic compound and water, until the conversion of the haloaromatic compound reaches 90 mole % or more and the melt viscosity of the resulting polyarylene thioether measured at 310° C. with a shear rate of 200 sec$^{-1}$ is 300 poise or less, and a latter stage of polymerization is conducted in which the water content in the reaction mixture is changed to 2.5 to 10 moles per mole of (A) and the temperature is raised to 240° to 280° C. so that the polyarylene thioether having a viscosity of 1,000 poise or more is produced, and wherein the reaction is conducted in the ratio of (B)/(A) being 1.0025 to 1.09 and at least the former stage of polymerization is conducted under at least either one of the stirring conditions that the apparatus used has the stirring power number of less than 1.2 at the Reynolds number of $5 \times 10^4$ or more or that the stirring power applied is less than 1.0 kw/m$^3$.

3. The process for producing a polyarylene thioether according to claim 1, wherein the haloaromatic compound consists essentially of para-dichlorobenzene.

4. A process according to claim 1, wherein the haloaromatic compound is para-dichlorobenzene and meta-dichlorobenzene, and the polyarylene thioether resulting therefrom is a block copolymer consisting essentially of a block of polyparaphenylene sulfide and a block of polymetaphenylene sulfide.

5. A process according to claim 1, wherein the equivalent weight ratio of (B)/(A) is 1.005 to 1.2.

6. The process according to claim 1, wherein the stirring power number is 1.4 or more.

7. The process according to claim 1, wherein the stirring power is 1.1 kw/m$^3$ or more.

8. The process according to claim 1, wherein the alkali metal sulfide is sodium sulfide.

9. The process according to claim 1, wherein the organic polar solvent is N-methylpyrrolidone.

* * * * *